Sept. 15, 1964     L. A. DE LISLE ET AL     3,148,906

BALE HOOK

Filed June 5, 1962                                                      2 Sheets-Sheet 1

INVENTORS
LAWRENCE A. DELISLE
BY LAWRENCE G. DELISLE

*Warren D. Hackbert*
Attorney

Sept. 15, 1964  L. A. DE LISLE ET AL  3,148,906
BALE HOOK
Filed June 5, 1962  2 Sheets-Sheet 2

INVENTORS
LAWRENCE A. DELISLE
BY LAWRENCE G. DELISLE

Attorney 3,148,906
BALE HOOK
Lawrence A. De Lisle and Lawrence G. De Lisle, both of Rte. 2, Knox County, Ind.; Pansy M. De Lisle, executrix of Lawrence A. De Lisle, deceased
Filed June 5, 1962, Ser. No. 200,104
6 Claims. (Cl. 294—26)

The present invention relates to a bale hook, and more particularly to a new and improved bale hook which provides highly effective releasing action through a novel arrangement of operative components.

As is known, it is difficult to transfer baled material, such as hay, for example, with a conventional hooking device, and then withdraw the latter from the baled material, as desired. Any prior mechanical hooking and releasing mechanisms have generally proven unsatisfactory because of the complexity thereof for effective use.

By virtue of the instant invention, the applicants have provided a new and novel bale hook comprising a minimum number of operative components which, when in a first position, positions the hook element thereof for effective hooking of baled material and, when in a second position, readily releases the hook element for easy withdrawal therefrom. The aforementioned action is carried out through a locking member for the hook element which is selectively released by a control arm normally retained in a baling condition. When the control arm is rotated, the locking member pivots from a normal locking position at which it abuts a stop element to a position where it can pass such stop element, thereby permitting the rotation of the hooking element which is operatively connected thereto, as desired for ready withdrawal. The mechanism is then returned to its normal position by spring means associated with the control arm.

Accordingly, the principal object of the present invention is to provide a new and novel bale hook which is readily movable from a hooking to a hook releasing position.

Another object of the present invention is to provide a bale hook having a hooking element normally urged to a hooking position, but readily rotatable to permit the withdrawal thereof from baled material.

A still further and more general object of the present invention is to provide a bale hook having a novel structure which acts in a positive and reliable manner, but which, at the same time, comprises a minimum number of components.

Other objects and a better understanding of the invention will become more apparent from the following description, taken in conjunction with the accompanying drawings, wherein—

Figure 1:
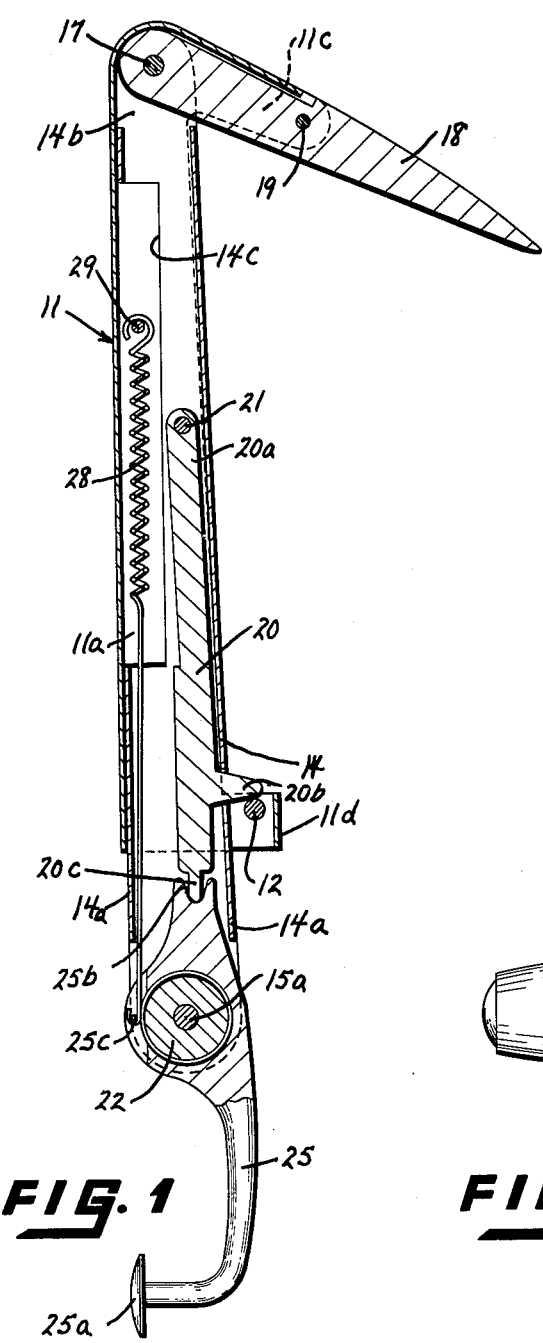
FIG. 1 is a view mostly in cross-section of the bale hook forming the instant invention, taken at line 1—1 of FIG. 2 and looking in the direction of the arrows.

For the purposes of promoting an understanding of the principles of the invention, reference will now be made to the embodiment illustrated in the drawings, and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the applicants' novel bale hook 10 comprises a casing 11 formed by slightly tapering walls 11a and 11b which angle at one end thereof to define a portion 11c, where the latter generally blends into the configuration of the hooking element, as should be apparent from FIG. 1. A bridge portion 11d extends between the walls 11a and 11b at the opposite end of the casing 11, where a stop member 12, typically circular in cross-section, is disposed therewithin (see FIGS. 1 and 3). Moreover, it should be noted that one surface of the casing 11 is open, i.e. the side thereof nearest the bridge portion 11d. In a preferred embodiment of the invention, the casing 11 is made from sheet metal, with the portion 11c thereof forming a unitary structure.

Slidably disposed within the casing 11 is an elongated body member 14, typically a hollow channel, having an end 14a thereof extending beneath the bridge portion 11d in the casing 11 and receiving knobs 15 thereon. The knobs 15, which are positioned by a bolt and nut 15a and 15b, respectively, define a handle which the user grasps when hooking or unhooking the baled material, to be discussed more fully herebelow.

Figure 3:
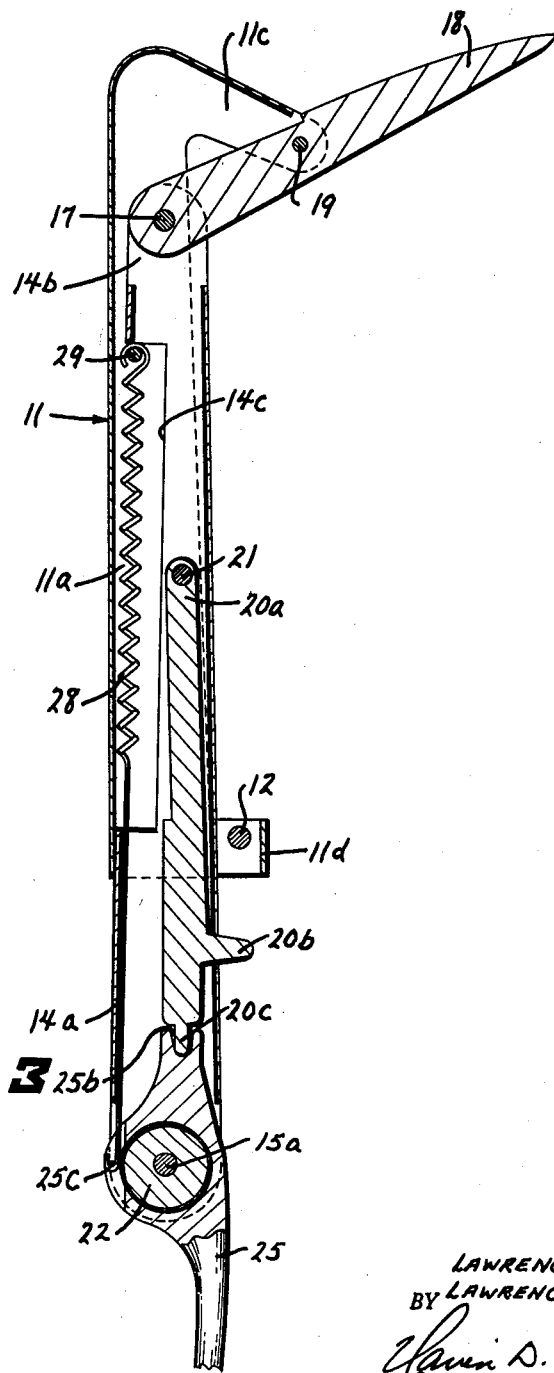
FIG. 3 is a view of the invention generally corresponding to that of FIG. 1, but showing the relation of the operative components when the hooking element thereof is in a released or withdrawing position.

Another end 14b of the elongated body member 14 pivotally connects, at 17, a hooking element 18, where the latter rotates at an axis defined by a pivot 19 which extends between the side walls 11a and 11b defining the portion 11c of the casing 11. As should be evident from FIGS. 1 and 3, and as to be discussed more fully herebelow, the preceding relationship is such that the hooking element 18 can selectively move from a hooking position (FIG. 1) to an unhooking or withdrawing position (FIG. 3). Moreover, it should be observed that the hooking element 18 is so designed that the faces thereof lend themselves to ready use in connection with baled materials.

A locking member 20 is disposed within the elongated body member 14, where one end 20a thereof is pivotal at 21. The locking member 20 has an outwardly extending V-type portion 20b at one edge thereof, and a tooth-like portion 20c at its end opposite the aforesaid end 20a. It should be understood that the outwardly extending V-type portion 20b is normally in abutting relationship with the stop member 12, i.e. during baling, and is movable, through components to be described herebelow, to permit its passage past such stop member 12, when unhooking is desired.

Figure 2:
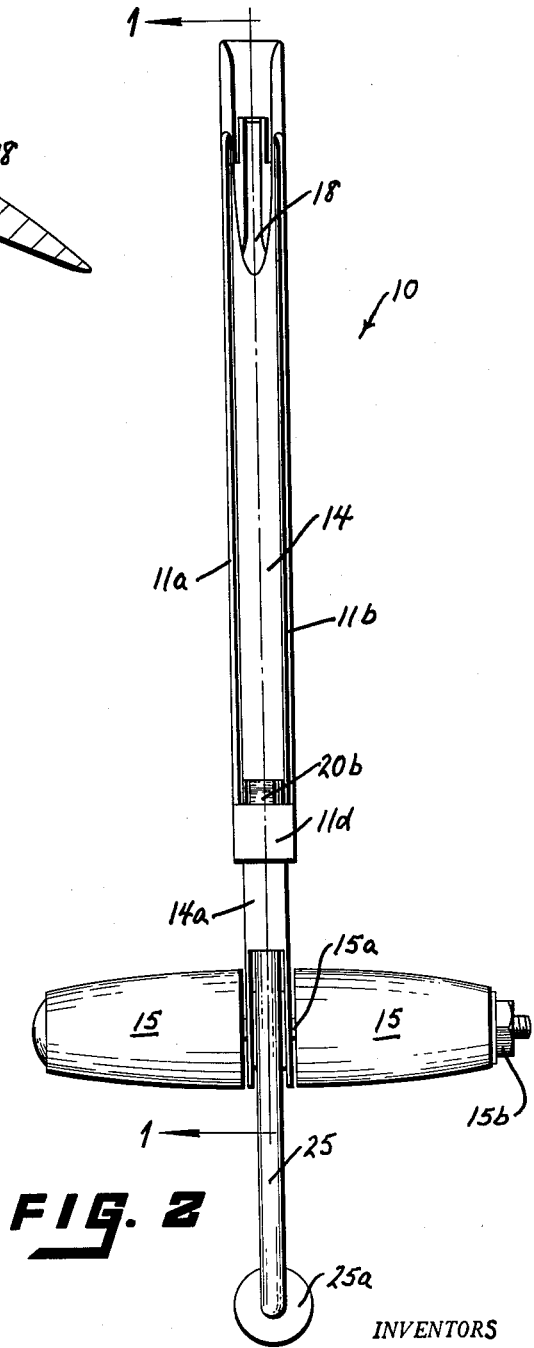
FIG. 2 is another view of the bale hook of FIG. 1, looking towards the hooking element thereof.

In any event, the end 14a of the elongated body member 14 also has a cutout portion through which a control arm 25 extends. As should be evident from FIGS. 1 and 3, and generally from FIG. 2, the control arm 25 rotates, on a bearing 22, about an axis defined by the bolt 15a, and, for ease, includes a button-like engaging area 25a at its free end. The control arm 25 further includes an indented portion 25b which is adapted to receive the tooth-like element 20c extending from the locking member 20.

In order to maintain the control arm 25 in a baling condition, a spring 28 extends between a retaining element 25c disposed thereon and another retaining element 29 which is disposed between the side walls 11a and 11b of the casing 11. It might be noted that in order to permit the movement of the elongated body member 14, the latter has a cutout portion 14c therein which can be most readily understood by noting its position with reference to the retaining element 29 of FIGS. 1 and 3.

In use, the bale hook 10 is in the position of FIG. 1, i.e. the spring 28 continuously urges the control arm 25 to its position of such figure, so that the outwardly extending V-type portion 20b on the locking member 20 is in abutting relationship with the stop member 12. When it is desired to release the hooking element 18, the control arm 25 is rotated so that the locking member 20, and, hence, the aforesaid outwardly extending V-type portion 20b thereof moves inwardly, i.e. away from the stop member 12. The latter is accomplished through the interconnection between the tooth-like portion 20c of the locking member 20 and the indented portion 25b in the control arm 25.

With the preceding action, the hooking element 18 is released from the position of FIG. 1 and may thereafter rotate at pivot axis 19 because of its pivotal connection, at 17, with the slidable elongated body member 14. As the hooking element 18 rotates to the position of FIG. 3, the elongated body member 14 is moving, within the casing 11, towards the handle. It should be apparent that the cutout surface of the casing 11 permits the small outward movement of the elongated body member 14 which occurs during unhooking (see FIG. 3).

With further reference to FIG. 3, it should be understood that the position of the locking member 20 disclosed therein is if the control arm 25 is released. In other words, the action of spring 28 forces the control arm 25 to the illustrated position. Actually, however, if the control arm 25 is continued to be pressed, i.e to the position where the outwardly extending V-type portion 20b of the locking member 20 can pass the stopping member 12, the locking member would be at spring side of such figure. Thereafter, and considering the size of the spring 28, release of the control arm 25 almost instantaneously returns the locking member 20 to its position of FIG. 1.

From the above, it should be apparent that the applicants herein have provided a new and novel bale hook which provides positive hooking and unhooking action with a minimum of operative components. It should be further apparent that the bale hook so described is susceptible to various changes within the spirit of the invention. For example, other dimensions and/or proportions can be utilized, and the outward configuration revised for various aesthetic effects. Accordingly, the above discussion should be considered illustrative, and not as limiting the scope of the following claims.

We claim:

1. A bale hook comprising a casing having a hook element rotatably mounted at one end thereof, a body member slidable along said casing and pivotally connected to said hook element at a point intermediate the ends thereof, a control arm rotatably disposed on said body member, a locking member having one end pivotally mounted on said body member and another end connected to a portion of said control arm for movement therewith, said locking member having a locking portion, a stop member disposed on said casing and engaged by said locking portion of said locking member at a first position of said control arm, and means urging said control arms to said first position.

2. The bale hook of claim 1 where said urging means extends between said control arm and a portion of said casing.

3. A bale hook comprising a casing having a hook element rotatably mounted at one end thereof, a body member slidable along said casing and pivotally connected to said hook element at a point intermediate the ends thereof, a control arm rotatably disposed on said body member, a locking member having one end pivotally mounted on said body member and another end connected to a portion of said control arm for movement therewith, said locking member having a locking portion, and a stop member disposed on said casing and engaged by said locking portion of said locking member at a first position of said control arm and disengaged by said locking portion of said locking member at a second position of said control arm.

4. The bale hook of claim 3 where said hook element is at a hooking position at said first position of said control arm and is adapted to move to an unhooking position at said second position of said control arm.

5. The bale hook of claim 3 where means extending between said casing and said control arm continually urge the latter to said first position.

6. A bale hook comprising a casing having a hook element rotatably mounted at one end thereof, a body member slidable along said casing and pivotally connected to said hook element at a point intermediate the ends thereof, a control arm rotatably disposed on said body member, a locking member having one end pivotally mounted on said body member and another end defined by a projecting portion, said control arm having an indented portion disposed in co-operative relationship with said projecting portion on said locking member, said locking member having a locking portion, a stop member disposed on said casing and engaged by said locking portion of said locking member at a first position of said control arm and disengaged by said locking portion of said locking member at a second position of said control arm, and means urging said control arm to said first position.

References Cited in the file of this patent
UNITED STATES PATENTS

| | | |
|---|---|---|
| 920,700 | Waterman | May 4, 1909 |
| 3,046,598 | Daugherty | July 31, 1962 |